Sept. 4, 1928.

O. E. SZEKELY 1,683,269

PISTON RING SPRING

Filed June 1, 1925

Inventor:
Otto E. Szekely
By Wm. O. Bell Atty.

Patented Sept. 4, 1928.

1,683,269

UNITED STATES PATENT OFFICE.

OTTO E. SZEKELY, OF MOLINE, ILLINOIS, ASSIGNOR TO JOHN A. RAMSEY, OF ST. LOUIS, MISSOURI.

PISTON-RING SPRING.

Application filed June 1, 1925. Serial No. 33,938.

Piston ring springs are designed to be placed beneath a piston ring between it and the piston, so as to maintain the ring in tight engagement with the walls of the cylinder at all times. The springs are commonly made in polygonal form, the corners of the polygon contacting with the inside face of the ring, to hold the ring in place. The springs have been made of one piece of spring metal bent to form the polygonal shape above referred to. The ends of the spring have been commonly arranged to occur between the corners of the polygonal figure and these ends may or may not overlap. The result is that instead of having the spring assume a definite shape in which all parts shall function as they are supposed to do, the spring may take a form in which some corners do not contact with the inner surface of the ring and thereby the efficiency is greatly decreased. Again the number of sides provided and the curvature of the bends has been determined more or less on an arbitrary hit or miss basis with the result that the springs have been subjected to stresses which they are not properly designed to resist and when they are removed it is found that they have lost their shape, failing to return to the original form which they had before being used.

It is therefore a primary object of my invention to provide a piston ring spring having a form which has been properly determined so as to distribute the stresses uniformly throughout the spring and which will accordingly retain its shape and elasticity much longer than the springs hitherto used.

More particularly the object of my invention is to provide a spring having a number of sides which has been found to give the best results and also having the sides joined by a curvature which will insure proper transmission of the stress from the piston ring to the sides of the spring.

A still further object of my invention is to provide a piston ring spring having its ends so arranged that they will co-operate with each other to supply a corner of the polygonal figure formed by the spring.

Figure 1:
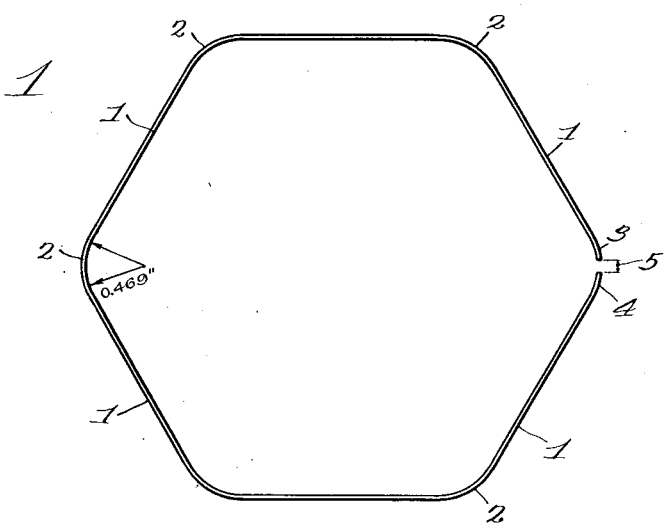
Figure 2:
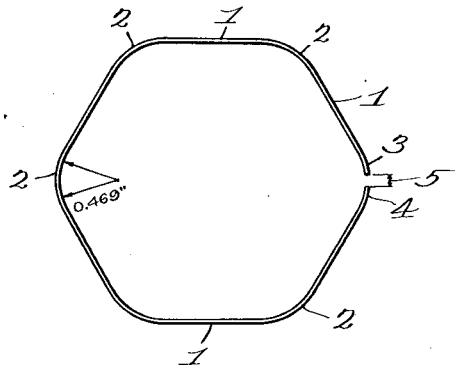

In the accompanying drawing in which I have shown selected embodiments of my invention;

Fig. 1 is an elevation of a piston ring spring constructed according to my invention and Fig. 2 is a similar view showing another size of spring.

It will be seen that, regardless of the size of ring with which the spring is to be used, my spring is made of six sides. This number of sides is best because each side is equal to the radius of the circumscribed circle represented by the inner surface of the piston ring. The six sided figure is therefore structurally strong and will insure an equal distribution of stresses. Moreover, the length of the sides is such that they maintain their flexibility much better than where more numerous and shorter sides are employed. These shorter sides are naturally much more rigid and permit less "life" to be evident in the action of the piston ring.

I therefore prefer to make my piston ring spring of six sides each designated by the numeral 1 and joined by curves 2. These curves have in the past been made more in the nature of bends than in the form of properly designed curves. It will be noted that each curve is in the form of a spring arch and I have so designed it, and have determined its curvature so that it will have sufficient strength to properly transmit the stresses received by it to the straight sides 1 and can take up the lost motion and expansion in the piston ring itself. I have found by calculation, which has been borne out by the results of many experiments that, regardless of the length of the sides, the radius of the curves 2 which gives the above results is 0.469 inches. A shorter radius results in an arch which is too stiff, whereas a longer radius results in an arch which is too flat and weak. Of course, it is to be understood that the above radius of curvature may be varied somewhat, but I desire to claim the curves joining the sides of the spring as one of substantially the aforesaid radius.

It is important that the spring have only six sides, that these six sides be joined together by curves of equal radii, and that the spring be divided at the center of one of these curves, the curved ends of the spring having the same radius as the other curves. It is found in commercial practice that a spring of this type will distribute the stresses uniformly throughout its entire length, that it will maintain its flexible qualities and will give life to the piston ring.

The ends 3 and 4 are curved, as plainly shown in both Figs. 1 and 2 and this curvature is on the same radius as the curves 2 joining the other sides 1. A uniform distance 5, say 3/32nds of an inch is left between the ends 3 and 4, the length of the spring being so designed that it will then fit within the piston ring, with which it is intended to be used, and assume its proper form. The ends 3 and 4 then receive the stress in the same manner as do the curves 2 and transmit it to the sides 1, so that the distribution of stress is uniform throughout the spring. Moreover, by making the ends in this manner and locating them at this place on the spring, it is much easier to insert a spring beneath the piston ring. It may be fed in in the usual manner and it will be noted that there is not the sharp edge which would contact with and scratch the inner surface of the piston ring, which edge is present in those rings having the ends disposed between the corners.

From the above it will be apparent that I have provided a novel and improved piston ring spring which will effectively distribute the stresses uniformly throughout its length and which will insure uniform contact, at all corners of the spring, between it and the piston ring. The spring described above is the result of many experiments and calculations and has been found to be most satisfactory after many trials and tests thereof.

I am aware that changes in the form, construction and arrangement of parts may be made without departing from the spirit and without sacrificing the advantages of the invention and I reserve the right to make all such changes as fairly fall within the scope of the following claim.

I claim:

An integral piston ring spring having six equal sides joined together by curves of substantially equal radii and divided at the center of one of said curves, the curved ends of the spring having the same radius as the other curves, the radius of each curve being substantially 0.469 inches and the sides between said curves being substantially straight, whereby the ends of the spring will exert substantially the same pressure as the other curves and thus assure uniformity of stress distribution throughout the entire spring.

OTTO E. SZEKELY.